US009400961B2

(12) United States Patent
Dufosse et al.

(10) Patent No.: US 9,400,961 B2
(45) Date of Patent: Jul. 26, 2016

(54) MESSAGE MECHANISM FOR WORKFLOW INTERFACING

(75) Inventors: Eric Denis Dufosse, Portland, OR (US); Nadine Patry, Rennes (FR); Wilfried Reiner, Darmstadt (DE)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 509 days.

(21) Appl. No.: 12/450,537

(22) PCT Filed: Apr. 7, 2008

(86) PCT No.: PCT/US2008/004511
§ 371 (c)(1),
(2), (4) Date: Sep. 29, 2009

(87) PCT Pub. No.: WO2008/127581
PCT Pub. Date: Oct. 23, 2008

(65) Prior Publication Data
US 2010/0122266 A1    May 13, 2010

Related U.S. Application Data

(60) Provisional application No. 60/923,028, filed on Apr. 12, 2007.

(51) Int. Cl.
*G06Q 10/06*        (2012.01)
(52) U.S. Cl.
CPC ...................................... *G06Q 10/06* (2013.01)
(58) Field of Classification Search
None
See application file for complete search history.

(56) References Cited

U.S. PATENT DOCUMENTS

| 5,404,316 | A  | * | 4/1995  | Klingler et al. ................ 715/723 |
| 6,167,404 | A  | * | 12/2000 | Morcos et al. |
| 6,442,748 | B1 |   | 8/2002  | Bowman-Amuah |
| 6,574,609 | B1 | * | 6/2003  | Downs et al. ................... 705/50 |
| 6,615,166 | B1 |   | 9/2003  | Guheen et al. |
| 6,839,680 | B1 | * | 1/2005  | Liu et al. ...................... 705/7.33 |
| 6,904,408 | B1 | * | 6/2005  | McCarthy et al. ............... 705/2 |
| 7,613,704 | B2 | * | 11/2009 | Lobo |
| 7,720,918 | B1 | * | 5/2010  | Martin et al. ................. 709/206 |
| 2001/0053275 | A1 | * | 12/2001 | Adachi et al. .................... 386/52 |
| 2002/0032655 | A1 | * | 3/2002  | Antonin et al. ................. 705/43 |
| 2002/0059625 | A1 | * | 5/2002  | Kurauchi ........................ 725/91 |

(Continued)

FOREIGN PATENT DOCUMENTS

EP    1339000       8/2003
JP    2002118707 A  4/2002

(Continued)

OTHER PUBLICATIONS

Huang et al., "Agent-based workflow management in collaborative product development," Computer-Aided Design 32, 200, pp. 133-144, Publication Date: Feb. 21, 2000.

(Continued)

*Primary Examiner* — Shih-Wei Kraft
(74) *Attorney, Agent, or Firm* — Arent Fox LLP

(57) ABSTRACT

A simple message mechanism serves to interface applications within content management system. The message management mechanism operates by extracting at least one selected parameter during execution of at least one task (e.g., application) during content workflow. The operator is then notified of whether the at least one task executed successfully in accordance with the extracted parameter.

6 Claims, 2 Drawing Sheets

(56) References Cited

U.S. PATENT DOCUMENTS

| | | | |
|---|---|---|---|
| 2002/0065816 A1* | 5/2002 | Tsusaka et al. | 707/3 |
| 2002/0095387 A1* | 7/2002 | Sosa et al. | 705/65 |
| 2002/0112180 A1* | 8/2002 | Land et al. | 713/200 |
| 2002/0143782 A1* | 10/2002 | Headings et al. | 707/100 |
| 2002/0147645 A1* | 10/2002 | Alao et al. | 705/14 |
| 2002/0152278 A1* | 10/2002 | Pontenzone et al. | 709/217 |
| 2002/0184111 A1* | 12/2002 | Swanson | 705/26 |
| 2002/0188527 A1* | 12/2002 | Dillard et al. | 705/27 |
| 2003/0018508 A1 | 1/2003 | Schwanke | |
| 2003/0069803 A1* | 4/2003 | Pollitt | 705/26 |
| 2003/0079160 A1* | 4/2003 | McGee | G06F 11/0709 714/39 |
| 2003/0163346 A1 | 8/2003 | Tinti et al. | |
| 2004/0030992 A1* | 2/2004 | Moisa | G06Q 10/10 715/234 |
| 2004/0064552 A1 | 4/2004 | Chong et al. | |
| 2004/0111284 A1 | 6/2004 | Uijttenbroek | |
| 2004/0172585 A1 | 9/2004 | Nelson | |
| 2004/0199867 A1* | 10/2004 | Brandenborg | 715/500.1 |
| 2005/0283394 A1* | 12/2005 | McGloin et al. | 705/10 |
| 2006/0015806 A1 | 1/2006 | Wallace | |
| 2006/0028987 A1 | 2/2006 | Gildfind et al. | 370/232 |
| 2006/0156219 A1* | 7/2006 | Haot et al. | 715/500.1 |
| 2006/0288346 A1* | 12/2006 | Santos | G06F 9/4887 718/102 |
| 2007/0011334 A1* | 1/2007 | Higgins et al. | 709/227 |
| 2007/0033590 A1* | 2/2007 | Masuouka et al. | 718/100 |
| 2007/0038499 A1 | 2/2007 | Margulies et al. | |
| 2007/0050382 A1* | 3/2007 | Bugir et al. | 707/100 |
| 2008/0124050 A1* | 5/2008 | Deschamp et al. | 386/109 |
| 2008/0228580 A1* | 9/2008 | Korman et al. | 705/14 |
| 2009/0031216 A1* | 1/2009 | Dressel et al. | 715/255 |

FOREIGN PATENT DOCUMENTS

| | | | |
|---|---|---|---|
| JP | 2004151893 A | | 5/2004 |
| JP | 2005045726 A1 | | 2/2005 |
| JP | 2005151010 A | | 6/2005 |
| JP | 2005292998 A1 | | 10/2005 |
| JP | 2006099728 A1 | | 4/2006 |
| WO | WO 98/42103 A1 | | 9/1998 |
| WO | WO 00/08806 A1 | | 2/2000 |
| WO | 2006096713 A2 | | 9/2006 |
| WO | 2008127581 A2 | | 10/2008 |

OTHER PUBLICATIONS

Search report dated Nov. 3, 2008.

Extended European Search Report in European Patent Application No. 08742626.8 dated Feb. 24, 2012.

First Office Action dated Dec. 27, 2010 regarding China Patent Application No. 200880011694.1.

Second Office Action dated Nov. 22, 2011 regarding China Patent Application No. 200880011694.1.

Third Office Action dated Mar. 1, 2012 regarding China Patent Application No. 200880011694.1.

Notification of Reasons for Refusal dated Sep. 18, 2012 regarding Japan Patent Application No. 2010-503032.

Notice of Reason for Rejection dated Feb. 26, 2013 regarding Japan Patent Application No. 2010-503032.

EP Communication dated Jan. 7, 2015 regarding EP08742626.8.

Canadian Office Action dated Jul. 28, 2015 regarding Canadian Application No. 2,682,951.

* cited by examiner

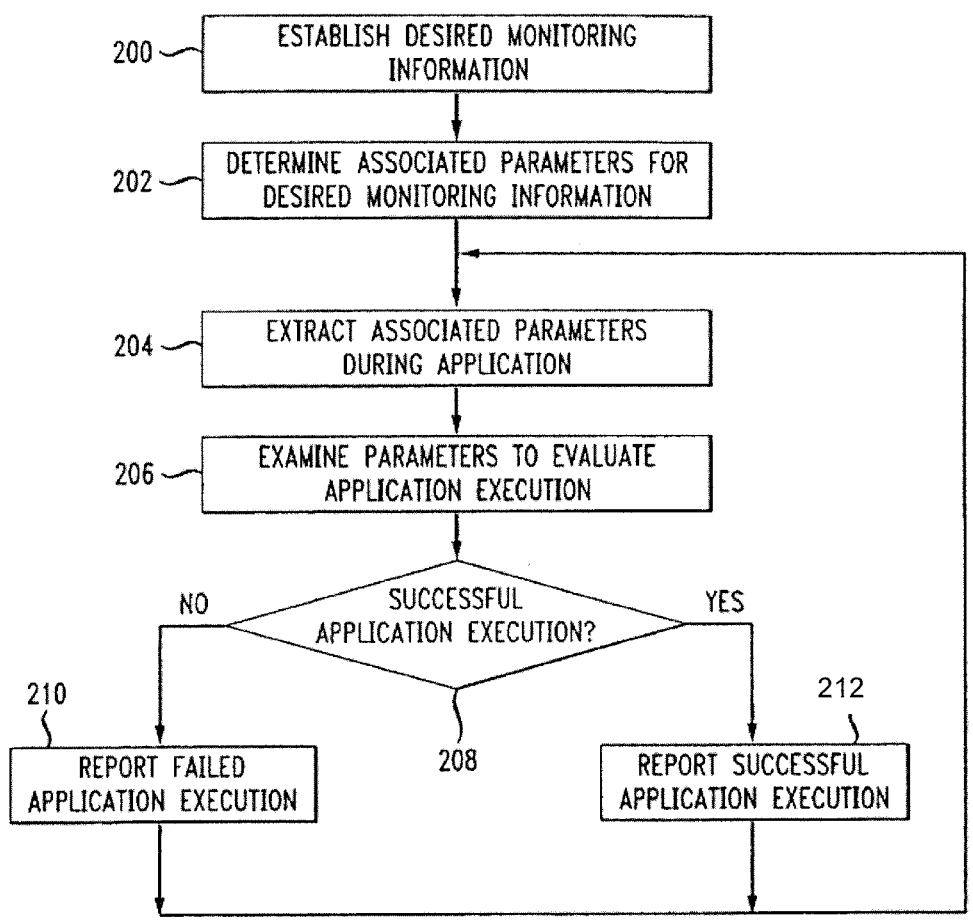

MESSAGE MECHANISM FOR WORKFLOW INTERFACING

CROSS-REFERENCE TO RELATED APPLICATIONS

This application claims the benefit, under 35 U.S.C. §365 of International Application PCT/US2008/004511 filed Apr. 7, 2008 which was published in accordance with PCT Article 21(2) on Oct. 23, 2008 in English and which claims the benefit of U.S. Provisional Patent Application No. 60/923,028 filed on Apr. 12, 2007.

TECHNICAL FIELD

This invention relates to a technique for interfacing elements in a content management system.

BACKGROUND ART

Entities, such as broadcasters, that receive, process and/or distribute content, in the form of electronic files containing audio-visual programs, typically make use of large systems for managing such content. For ease of discussion, the receipt, processing and/or distribution of content collectively comprise the general task of content workflow.

The processing of content within a particular content work flow can include various operations. A given operation, such as non-linear editing for example, will typically require at least one, and sometimes several different elements, each comprising either hardware, software, or a combination of both. In many instances, a single vendor might offer all of the elements necessary to carry out a given content processing operation or set of operations. However, other content processing operation can require elements from several different vendors.

The combination of elements from several different vendors to carry out one or more processing operations can pose problems in terms of content standardization. For example, within the media industry, hundred of solutions exist to manipulate the content by way of non linear editing. For this reason, some vendors offer equipment compatible with several known standardized formats, such as the Advanced Authoring Format (AAF) which makes use of an edit decision list with reference to the edited material. The AAF format has not enjoyed universal acceptance and typically finds application in specific areas like post production. The Material EXchange Format (MXF) has become a standard for streaming and storage of content and handles the transport of essence and metadata well, including multilayers and segment content. However, MXF only works well with for simple composite content and lacks universal applicability. For this reason, a number of suppliers of content process equipment support the AAF standard. However, present day solutions do not address operational aspects like task description, usage of the content, and priority.

BRIEF SUMMARY OF THE PRESENT INVENTION

Briefly, in accordance with a preferred embodiment of the present principles, there is provided a method to manage applications with limited interfacing capability with a framework that manages workflow in order to optimize operation. The method provides a simple message mechanism to interface applications within an operational workflow management solution. The method of the present principles commences by extracting at least one selected parameter during execution of at least one task (e.g., application) in a content workflow. The operator is then notified of whether the at least one task executed successfully in accordance with the extracted parameter.

BRIEF DESCRIPTION OF THE DRAWINGS

FIG. 2 depicts in flow chart form the steps of a process in accordance with the present principles for managing messages to interface the 3d-party sub-system to the content management system of FIG. 1;

DETAILED DESCRIPTION

Figure 1:
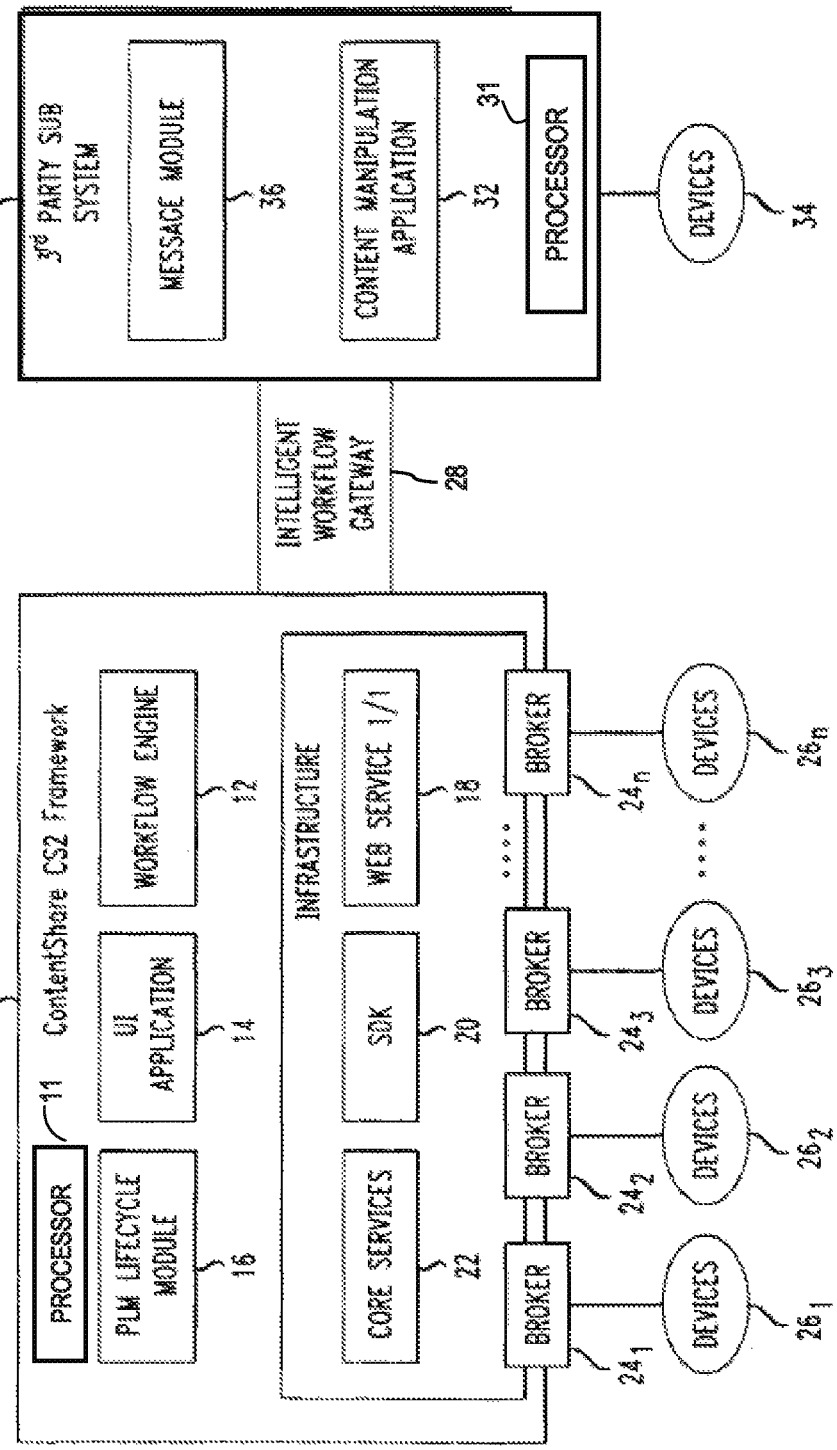
FIG. 1 depicts a block schematic diagram of a content management system that makes use of the message management technique of the present principles to interface with 3d-party subsystem.

FIG. 1 depicts a content management system 10, such as the Thomson Grass Valley "Content Share CS2" system available from Thomson Grass Valley, Beaverton, Oreg. The content management system 10 comprises a processor 11 in the form of a personal computer or mini computer that interfaces with one or more elements comprised of hardware, software or a combination of both. A primary element within the content management system 10 is a work flow element 12 which dictates various content manipulations performed by the content management system. Depending on the desired content workflow, the workflow engine 12 could ask to perform a content manipulation function such as non-linear editing. Another content manipulation operation could include content compression. Other content manipulation operations are well known and will not he described here.

Another element within the content management system 10 is a User Interface (UI) Application 14 that enables one or more operators to interact with the content management system via devices such as a keyboard and touch screen. In addition, the UI Application 14 extracts data from the content management system and manipulates that data for the display on one or more monitors (not shown) to provide the operator with information indicative of the operation of the content management system.

Another element within the content management system 10 is a Product Life Cycle Management (PLM) module 16 that operates to track the operation of the content management system. The PLM 16 interfaces with super systems, such as a Traffic System which controls resources and provides a process device resource management layer, which allows timed operations, such as Quality of service, in the entire system.

The content management system 10 includes an infrastructure having various parts which include a web service module 18 comprising software and/or hardware to link the content management system 10 to a network, such as the Internet. The content management system infrastructure also comprises a Software Development Tool Kit (SDK) 20 that includes one or more software programs accessible by an operator that allows for the addition, deletion and/or modification of software within the content management system 10. Lastly, the content management system infrastructure includes a core services module 22 that controls a core service such as the receipt of incoming content, the distribution of finished content, the collection of recording keeping information, and similar such functions.

The content management system 10 includes at least one, and preferably a plurality brokers $24_1, 24_2 \ldots 24_n$, where n is an integer, each broker serving to interface the content management system to a separate one of devices $26_1$-$26_n$, respectively. Each of the devices $26_1$-$26_n$ performs at least one function, and often, a plurality of functions, in connection with the receipt, processing, storage and/or distribution of content. Brokers serve as the interfaces to external process devices. In actuality, the brokers actually abstract the functionality of the various process devices and provide generalized interfaces for the content management system internal clients, which use the functionality of the process devices to provide a complex overall workflow. The process devices can be of course from the same manufacturer most often these process device will be from a third party, which will be integrated into the content management system using a corresponding Broker as interfaces.

In addition to the devices $26_1$-$26_n$, the content management system 10 includes an intelligent workflow gateway 28 which serves as a interface to link the content management system 10 to one or more independent third party sub-systems, illustratively illustrated by sub-system 30. The sub-system 30 typically includes a processor 31 or the like which controls at least one content manipulation application 32, either in the form of hardware, software or a combination of both. The content manipulation application 32 can itself perform one or more content manipulation operations, or it can do so with the aid of one or more device 34, similar in nature to the devices $26_1$-$26_n$.

The intelligent workflow gateway 28 is mainly used to decouple the content management system work flow engine 12 from the independent sub-system 30. In any case, the initial stimulus for the operations comes from the workflow engine 12 which forwards a workorder to the sub-system 30 via the intelligent workflow gateway 28. The Workorder includes information regarding a threshold (e.g., a parameter value) in the sub-system 30 which must be achieved and then trigger the backward messaging event to inform the workflow engine 12 about the successful completion of the Workorder sent to the sub-system 30 In addition the intelligent workflow gateway 28 can receive further information expected back from the sub-system 34 together with Workorder completion notification.

The intelligent workflow gateway 28 then independently monitors the execution of the Workorder (Tasks) at the sub-system 30 and delivers the expected information based on the previously established workorder completion threshold. Once the intelligent workflow gateway 28 has triggered the waiting work flow engine 12 workflow, the information thread is back in the workflow engine, which continues according to the workflow as part of the running Workpackage.

In accordance with an aspect of the present principles, the third party sub-system includes a messaging module 36 that takes order messages from the workflow mgmt system and provides response messages to the workflow engine of the content management system 10 indicative of a particular activity to alert an operator of the successful occurrence of a particular activity. The messaging module 36 typically takes the form of software that executes a process depicted in flow chart form in FIG. 2. The messaging process depicted in FIG. 2 commences upon execution of step 200 at which time an operator will typically establish the desired information for monitoring. In practice, the operator will typically want to know whether a given application within the content workflow performed by the sub-system 30 of FIG. 1 has executed properly. In addition, the operator might wish additional information, such as logging and timing data for example. Rather then the operator establishing the desired monitoring information during step 200, the messaging module 36 of FIG. could establish a default set of monitoring information which an operator could modify as desired.

Following step 200, step 202 of FIG. 2 undergoes execution, whereupon the messaging module 36 of FIG. 1 determines associated parameters for the desired monitoring information. Typically, the monitoring information gathered in connection with a particular activity will have one or more parameters associated therewith. Thus, the associated parameter(s) will themselves yield information about the activity, such as whether the activity executed successfully, Next, steps 204 of FIG. 2 undergoes execution and the messaging module 36 of FIG. 1 extracts the associated parameters previously determined during step 202 for the current activity undergoing execution by the content manipulation application 32 of FIG. 2. The messaging module 36 of FIG. 1 then examines the extracted parameters during step 206 to evaluate application execution. As discussed previously, one or more of the associated parameters determined during step 202 can provide an indication of whether the application executed successfully. Thus, by examining the parameters during step 206, the messaging module 36 can make a decision during step 208 whether application execution was successful. Depending on whether the application execution was successful, the messaging module can report successful application execution, or failure, during steps 210 and 212, respectively. In addition to reporting the status of the application execution during steps 210 and 212 of FIG. 2, the messaging module 36 of FIG. I can also report other information, such as logging and or timing data, during each of these steps. Following execution of either of steps 210 and 212, process execution returns to step 204 until such time extraction of the parameters of a given application has occurred, and no further applications await execution.

The foregoing describes a technique to a technique for interfacing at least one sub-systems element in a content management system by providing messages indicative of the sub-system operation.

The invention claimed is:

1. A method comprising:

managing, by a processor of a content management system, a workflow engine of the content management system to perform an audio-visual content manipulation operation for at least one activity to be performed in a workflow, wherein the audio-visual content manipulation operation comprises non-linear editing of an audio visual content;

providing a broker configured to interface the content management system with a separate device, wherein the broker abstracts at least one function of receipt, processing, storage, and distribution of the audio visual content performed by the separate device;

linking the content management system, by an intelligent workflow gateway, to one or more independent third party systems;

forwarding a work order to the independent third party sub-system via the intelligent workflow gateway for the at least one activity to be performed in the workflow, the work order including at least one parameter with a threshold for determining whether the at least one activity is successfully executed and triggering a backward messaging event to inform the workflow engine of the content management system via the intelligent workflow gateway about the successful execution of the at least one activity, wherein the at least one activity comprises the audio-visual content manipulation operation;

monitoring execution of the at least one activity in the independent third party sub-system to receive a notification when the at least one activity is executed successfully by the independent third-party subsystem in accordance with the at least one parameter; and delivering the notification to the workflow engine of the content management system.

2. The method according to claim 1 further comprising: delivering via the intelligent workflow gateway at least one of logging information and timing information associated with execution of the at least one activity.

3. The method according to claim 2 wherein the delivering the at least one of logging information and timing information is responsive to a request by an operator as being desired monitoring information.

4. A content management system comprising:
- a processor configured to execute a workflow engine to perform an audio-visual content manipulation operation for at least one activity to be performed in a workflow, wherein the audio-visual content manipulation operation comprises non-linear editing of an audio visual content;
- a broker configured to interface the content management system with a separate device, wherein the broker abstracts at least one function of receipt, processing, storage, and distribution of the audio visual content performed by the separate device; and
- an intelligent workflow gateway configured to link the content management system to an independent third party sub-system, wherein the intelligent workflow gateway forwards a work order for the at least one activity to the independent third party sub-system, the work order including at least one parameter with a threshold for determining whether the at least one activity is successfully executed and triggering a backward messaging event to inform the workflow engine of the content management system via the intelligent workflow gateway about the successful execution of the at least one activity, wherein the at least one activity comprises the audio-visual content manipulation operation, wherein the intelligent workflow gateway monitors execution of the at least one activity in the third party sub-system to receive a notification when the at least one activity is executed successfully by the independent third-party subsystem in accordance with the at least one parameter, and wherein the intelligent workflow gateway delivers the notification to the workflow engine of the content management system.

5. The content management system of claim 4 wherein the intelligent workflow gateway further receives from the third party subsystem at least one of logging information and timing information associated with execution of the at least one activity.

6. The content management system of claim 4, wherein the intelligent workflow gateway is further configured to decouple the independent third party sub-system from the content management system.

* * * * *